US005887506A

United States Patent [19]

Murphy

[11] Patent Number: 5,887,506

[45] Date of Patent: Mar. 30, 1999

[54] APPARATUS HAVING ANGLE BLADE LOBES FOR HIGH SPEED CUTTING OF ELASTOMERIC MATERIALS

[75] Inventor: Stephen Bernard Murphy, Medina, Ohio

[73] Assignee: The Goodyear Tire & Rubber Company, Akron, Ohio

[21] Appl. No.: 728,188

[22] Filed: Oct. 10, 1996

Related U.S. Application Data

[62] Division of Ser. No. 298,851, Aug. 31, 1994, abandoned.

[51] Int. Cl.[6] .................... B23D 57/00

[52] U.S. Cl. .................... 83/835; 83/846; 83/663

[58] Field of Search .................... 83/835, 838, 846, 83/663, 676, 508, 614, 636, 698.41, 487, 481, 482, 478, 658, 578, 675

[56] References Cited

U.S. PATENT DOCUMENTS

| | | | |
|---|---|---|---|
| 299,142 | 5/1884 | Hilton | 83/838 |
| 640,279 | 1/1900 | Dickerson | 83/838 |
| 1,874,750 | 8/1932 | Heston | 83/488 X |
| 1,914,528 | 6/1933 | Reid | 83/488 X |
| 3,072,004 | 1/1963 | Jenkins | 83/318 |
| 3,706,252 | 12/1972 | Hawkes et al. | 83/675 X |
| 3,757,618 | 9/1973 | Kuts | 83/471.3 |
| 3,762,259 | 10/1973 | Kuts | 83/471.3 |
| 3,848,501 | 11/1974 | Kuts | 83/471.3 |
| 3,876,266 | 4/1975 | Rozentals | 308/184 |
| 3,918,778 | 11/1975 | Jacobson et al. | 308/201 |
| 4,333,371 | 6/1982 | Matsuda | 83/835 X |
| 4,382,397 | 5/1983 | De Torre | 83/508 |
| 4,406,201 | 9/1983 | Barnes et al. | 83/487 |
| 4,414,874 | 11/1983 | Barnes et al. | 83/508 X |
| 4,840,098 | 6/1989 | Gammerler | 83/675 X |
| 4,901,929 | 2/1990 | Barclay | 83/500 X |
| 5,118,256 | 6/1992 | Violette et al. | 416/134 R |
| 5,131,971 | 7/1992 | Elia et al. | 83/276 X |
| 5,186,959 | 2/1993 | Tanaka | 83/950 X |

FOREIGN PATENT DOCUMENTS

| | | | |
|---|---|---|---|
| 0084347 | 7/1983 | European Pat. Off. | B26D 1/20 |
| 0252611 | 1/1988 | European Pat. Off. | B23Q 11/10 |
| 0488688 | 6/1992 | European Pat. Off. | F16G 1/00 |
| 1536978 | 8/1968 | France . | |
| 3310166 | 3/1983 | Germany | B26D 1/25 |
| 821087 | 4/1981 | U.S.S.R. | 83/675 |

*Primary Examiner*—Maurina T. Rachuba
*Attorney, Agent, or Firm*—Frederick K. Lacher

[57] ABSTRACT

A high speed rotary cutter assembly for cutting sheets of elastomeric materials wherein a rotary blade is affixedly mounted on one end of a spindle and rotates therewith at a rotational speed greater than 2000 rpm. The rotary blade includes a generally planar cutting surface and a tapered back surface to provide a clean cut and minimize abrasion of the cut surface. The rotary blade further includes between 4 and 40 peripheral lobes, each having an attack surface and a trailing surface. The trailing surface is cut more sharply than the attack surface to provide relief to the cut elastomeric material. The spindle includes a spindle bore which communicates cooling air to the rotary blade. The rotary cutter assembly also includes preloaded, permanently lubricated, angular contact ball bearings and a labyrinth seal to provide high speed operation without heat build-up. The cutter assembly includes a replacement means, which comprises a frame and gib lock, for quickly replacing worn shoe inserts and the insert assembly without the necessity for adjusting of the shoe or blade. The shoe insert has a top surface in the same plane as the top surface of the shoe and further includes grooves in the cutting face to relieve the surface.

15 Claims, 4 Drawing Sheets

APPARATUS HAVING ANGLE BLADE LOBES FOR HIGH SPEED CUTTING OF ELASTOMERIC MATERIALS

This application is a division of application Ser. No. 08/298,851, filed Aug. 31, 1994, now abandoned.

BACKGROUND OF THE INVENTION

1. Field of Invention

This invention pertains to the art of apparatus for cutting sheet-like materials, and more specifically to an apparatus for cutting reinforced elastomeric fabric such as that used in the manufacture of tires.

2. Description of the Related Art

Methods and apparatus for cutting elastomeric material in sheet form are known in the art.

Although the prior art methods and apparatus were generally effective, increasing demands for quality in the product such as tires have created a need for higher and higher quality in the cut materials. More specifically, the edge variation created by the different cutting methods and apparatus lead directly to performance improvements or performance problems in the finished product such as tires. For this reason, it has become important to develop methods and apparatus which minimize the edge variation in the cut materials as much as possible.

The present invention provides improved edge quality and precision, as well as other better and more advantageous overall results.

SUMMARY OF THE INVENTION

In accordance with the present invention, a new and improved apparatus for cutting reinforced elastomeric sheet material is provided.

More particularly, in accordance with one aspect of the invention, the high speed rotary cutter assembly includes a rotary blade which is rotatable at operating speeds greater than 2000 rpm and preferably at 5000 revolutions per minute.

In accordance with another aspect of the invention, the high speed rotary cutter assembly includes a spindle rotatably mounted in a bore of a housing. The spindle includes a bore with a spiral machined groove in the bore which communicates cooling air to the rotary blade and to the spindle. The spindle may include a cooling nozzle to propel air into the spindle bore if further cooling is required.

According to a further aspect of the invention, the high speed rotary cutter assembly includes a shoe having a shoe insert. The shoe insert cooperates with the rotary blade to provide a cutting surface for the associated elastomeric materials. The cutter assembly includes a frame mounted to the housing in slidable relationship to the rotary blade. Mounted on the frame are the shoe and shoe insert. The frame can be located such that the shoe and shoe insert are in proper relationship to the rotary blade for cutting the elastomeric material. The frame can also be moved away from the housing so that the shoe insert or entire shoe assembly can be quickly replaced. The shoe insert has a top surface which is in the same plane as a top surface of the shoe. In a preferred embodiment, the shoe insert includes a grooved cutting surface for reduced surface contact. The cross-sectional shape of the shoe insert may resemble the cross-sectional shape of an I beam.

According to a further aspect of the invention, the rotary blade has an operating rotational speed S with S being greater than 2000 rpm. The rotary blade also has lobes L with the number of lobes being between 4 and 40. Each of the lobes L of the rotary blade has an attack angle AA between 0 degrees and 20 degrees. The configuration of the lobes include an attack surface 146 and trailing surface separated by peak. The attack surface makes an attack angle AA with a plane P—P containing the sheet of elastomeric material as shown in FIG. 9. The attack angle is preferably between 0 degrees and 20 degrees. The trailing surface makes a trailing angle TS with the attack surface 146 of about 110 degrees.

According to another aspect of the invention there is provided a method for high speed rotary cutting of a sheet of elastomeric material comprising the steps of rotating a rotary blade at a rotational speed S greater than 2000 rpm and passing a sheet of elastomeric materials past the rotary blade so that the rotary blade cuts the sheet of elastomeric material. The elastomeric material is supported on a shoe and a shoe insert with the top surface of the shoe being in a shoe plane and the top surface of the shoe insert also being in the shoe plane. The method further includes the step of cooling the blade by communicating air through a spindle bore to the blade.

In accordance with a further aspect of the invention there is provided a high speed rotary cutter assembly for cutting a sheet of elastomeric material comprising a rotary blade having an operating rotational speed S with S being greater than 2000 rpm, said rotary blade also having a plurality of lobes, one of said lobes of said rotary blade having an attack surface and a trailing surface separated by a peak, said attack surface making an attack angle AA with a plane containing said sheet of elastomeric material, said attack angle AA being between 0 degrees and 20 degrees, said trailing surface making a trailing angle TS with said attack surface, said trailing angle TS being about 110 degrees. One advantage of the present invention is the provision of a new and improved rotary cutter apparatus and method which can be used to produce high quality cut elastomeric materials.

Another advantage of the invention is the provision of a method and apparatus for rotary cutting sheets of elastomeric materials which improves the edge quality and edge variation of the cut sheets.

A still further advantage of the invention is the provision of a rotary cutting assembly which operates at higher speeds than prior art apparatus.

Still another advantage of the invention is the provision of apparatus for quickly, easily, and accurately replacing worn shoe inserts and shoes without the need for multiple adjustments of the shoe, shoe insert and blade.

Other benefits and advantages of the invention will become apparent to those skilled in the art to which it pertains upon a reading and understanding of the following detailed specification.

IN THE DRAWINGS

The invention may take physical form in certain parts and arrangement of parts, a preferred embodiment of which is described in detail in this specification and illustrated in the accompanying drawings which form a part hereof and wherein.

DESCRIPTION OF THE PREFERRED EMBODIMENT

Figure 1:
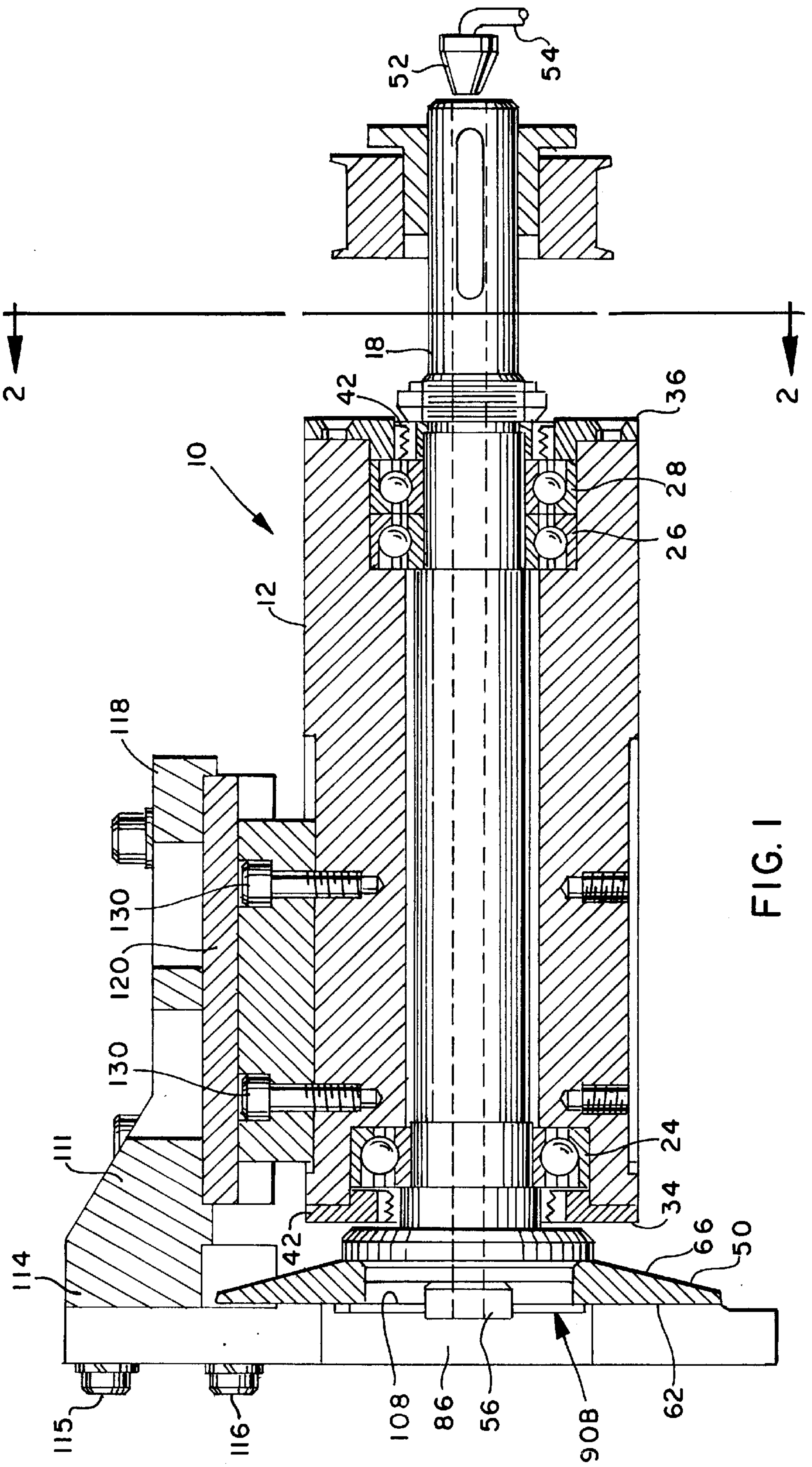
FIG. 1 is a cross-sectional view of a rotary cutter assembly according to the invention.

Referring now to the drawings wherein the showings are for the purposes of illustrating a preferred embodiment of the invention only and not for purposes of limiting the same, FIG. 1 shows a cross-sectional view of an inventive rotary cutter assembly 10. The assembly 10 includes a housing 12 and a spindle 18. The spindle 18 is rotatably suspended within the housing 12 by bearings 24, 26, 28. The bearings 24, 26, 28 are precision, preloaded angular contact ball bearings suitable for high speed applications. The rotary cutter assembly 10 can operate at speeds as high as 7500 rpm. The bearings 24, 26, 28 are permanently prelubricated to facilitate low maintenance operation.

The housing 12 has a first end 34 and a second end 36. At the first end 34 of the housing 12 is a labyrinth seal 42. The labyrinth seal 42 is a non-contact seal which is helpful for keeping contaminants out of the assembly 10 and retaining lubricating fluid within. The non-contact design reduces friction, heat build-up and drive torque requirements.

The spindle 18 includes a spindle bore 46. The spindle bore 46 may have a spiral machined groove which is helpful in providing cooling of the spindle 18 and a rotary blade 50. In some applications, it may be advantageous to mount a cooling nozzle 52 adjacent the spindle 18. The cooling nozzle 52 may be connected to an air hose 54 in communication with an air supply such as factory air at 80 psi. One type of cooling nozzle 52 which is believed to be effective would be that manufactured by Transair.

With reference to FIGS. 1–4 and FIGS. 6–9, the innovative rotary blade 50 is shown. The rotary blade 50 is affixedly mounted to a first end 56 of the spindle 18 and rotates therewith. The rotary blade 50 is preferably manufactured of tungsten-carbide and is coated with a non-stick plasma coating such as $B_4N$. One important feature of the innovative rotary blade 50 is its cross-sectional shape, as illustrated in FIGS. 1, 3, 6 and 7. The rotary blade 50 has a generally planar cutting surface 62 and generally planar tapered back surface 66. The cutting surface 62 lies generally in a cutting surface plane 70 and the back surface 66 lies generally in a back surface plane 68. The back surface plane 68 makes an angle $\alpha$ with the cutting surface plane 70. The angle $\alpha$ is between 10 degrees and 90 degrees and is preferably about 25 degrees. This blade 50 provides a clean cut and minimizes abrasion of the cut material.

Figure 2:
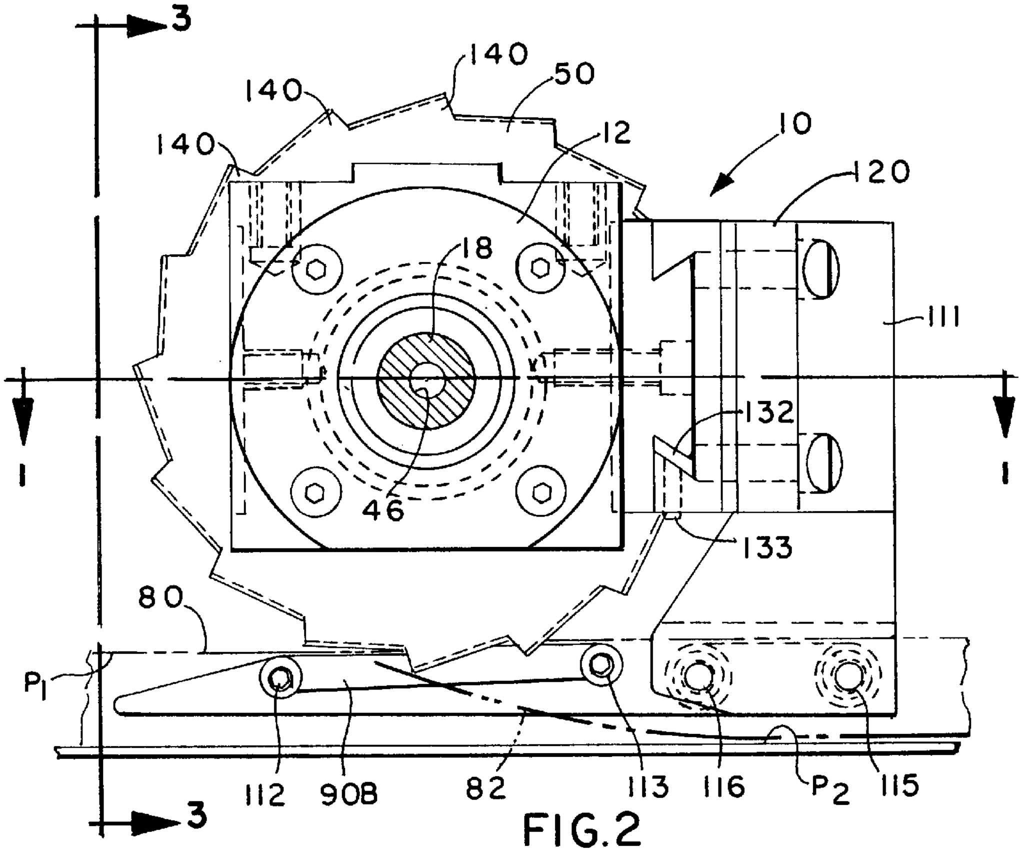
FIG. 2 is a schematic end view of the rotary cutter assembly taken along line 2—2 in FIG. 1.
Figure 3:
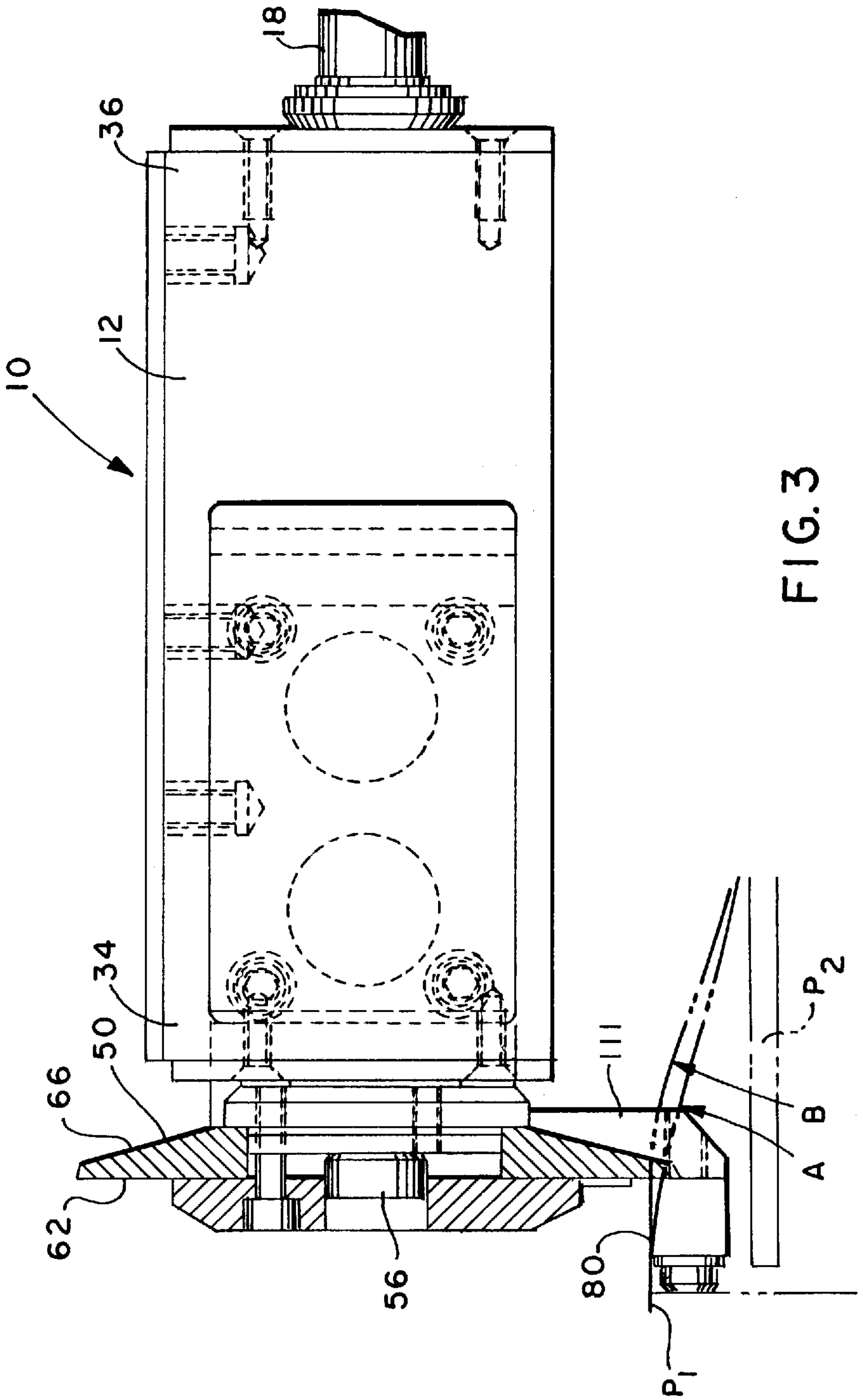
FIG. 3 is a side view of the rotary cutter taken along line 3—3 in FIG. 2 with parts being broken away.

Referring to FIGS. 2 and 3, a sheet of reinforced elastomeric material 80 shown diagrammatically in dashed dot lines is supported on an upper pan $P_1$, which has an edge along which a shoe 86 carried by the rotary cutter assembly is moved across the material a distance of about 120 inches (304.8 cm) for the application shown. The traversing speed may be 400 feet per minute. As the shoe 86 moves across the sheet of elastomeric material 80, it lifts the sheet from the position A shown in FIG. 3 to the position B. After the sheet of reinforced elastomeric material 80 is cut a trailing edge 82 will drop to a lower pan $P_2$ as shown in FIG. 2. Because blade 50 is tapered, there is minimum abrasion of edge 82.

Figure 5:
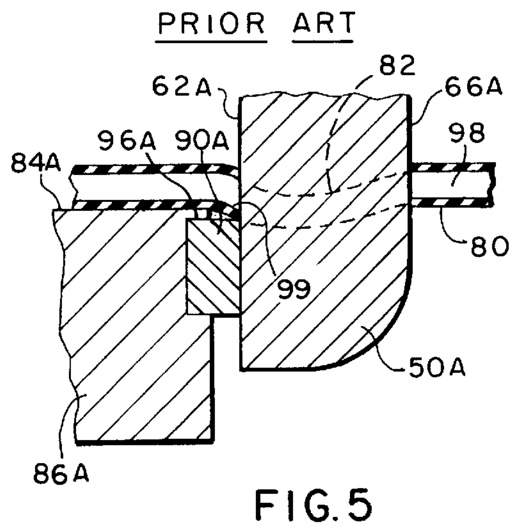
FIG. 5 is a schematic fragmentary cross-sectional view of a rotary blade according to the prior art.

With reference to FIG. 5, a prior art rotary blade is shown. As is evident, the cutting surface 62A of the prior art rotary blade 50A is generally parallel to the back surface 66A. For low speed cutters this blade design is acceptable. However, with high speed cutters the blade is heavy and retains heat. The rotary blade 50A also contacts the trailing edge 82 of the sheet of elastomeric material 80 causing undesirable abrasion of the edge 82.

Figure 6:
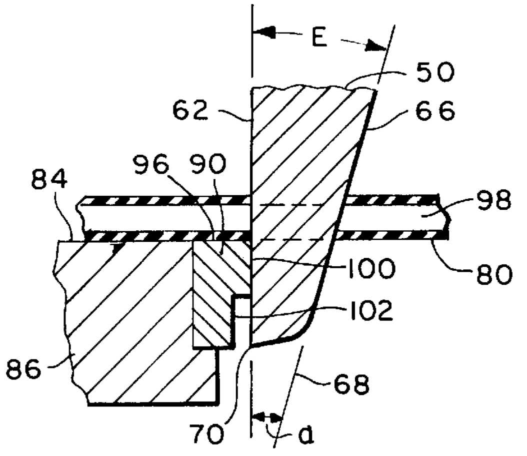
FIG. 6 is a fragmentary cross-sectional schematic view of a shoe, shoe insert and rotary blade embodying the invention.
Figure 7:
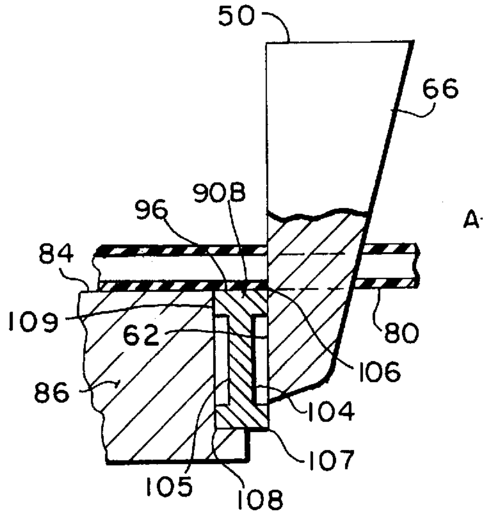
FIG. 7 is a schematic fragmentary cross-sectional view of an alternate embodiment of shoe insert according to the invention.

With reference to FIGS. 6 and 7, the innovative shoe insert design of the invention is shown. The associated sheet of reinforced elastomeric material 80 rests upon a top surface 84 of a shoe 86. A shoe insert 90,90B is affixed to the shoe 86.

With reference to FIG. 5, a prior art shoe insert 90A is shown which is recessed slightly below the top surface 84A of the shoe 86A. In fact, a top surface of the prior art shoe insert 90A was 0.030 inches (0.0762 cm.) beneath the top surface 84A of the shoe 86A. As can be seen in FIG. 5, this offset required the elastomeric material 80 to deflect slightly at the point of cutting. The position of the insert 90A below the top surface 84A causes reinforcing wires 98 to be cut at an angle. This results in sharp chisel cut ends 99 which are not desirable in the building of tires.

With reference to FIGS. 6 and 7, the top surface 96 of the innovative shoe inserts 90, 90B lie in the same plane as the top surface 84 of the shoe 86. This orientation has provided for cutting the wires 98 squarely so that the ends are blunt and will not cut other components in the manufacture of tires.

With continuing reference to FIG. 6, the shoe insert 90 is mounted on the shoe 86 and a side surface is recessed to form groove 102 adjacent cutting edge 100 for reducing surface contact between the cut trailing edge 82 and the insert 90 providing relief so that the heat generated will be minimized and there is no problem with objectionable smearing and formation of crumbs. The shoe insert 90B shown in FIGS. 1, 2, 7 and 8 has a cross section of an I-beam with grooves 104 and 105 in opposing surfaces and cutting edges 106, 107, 108 and 109. The insert 90B may be fastened to the shoe 86 by suitable fasteners positioned over the grooves 104 or 105 at the ends of the insert 90B. For example in the preferred embodiment shown socket head button cap screws 112, 113 are threaded in the housing to overlap ends of the insert 90B in the grooves 104. The insert 90B with an I-beam cross section may be rotated and turned over to provide four cutting edges 106, 107, 108 and 109 with one insert 90B. The length of the inserts 90 and 90B need not be longer than that which is necessary to cut the reinforcing wires 98. The shoe insert 90B are preferably coated with titanium nitrate for hardness.

With reference to FIGS. 1, 6 and 7, one important feature of the innovative rotary cutter assembly 10 is the ability to quickly and accurately change worn shoe inserts 90 and 90B. Prior art cutters required separate adjustments for the gap between the rotary blade 50 and the shoe insert 90A, as well as adjustment for the cant angle of the blade and shoe insert. The number and complexity of these adjustments has resulted in a time consuming setup operation. Whenever a prior art shoe insert 90A was worn, the rotary cutter assembly 10 had to be shut down for an extended period of time while the changes were made. The change was complex enough that setup specialists were required. An improper setup could damage the rotary blade 50 which was relatively expensive. The innovative rotary cutter assembly 10 has several features which work together to make the replacement of a shoe 86 or shoe insert 90B not only quick and easy but highly accurate. First, the housing 12 is precision-machined for parallelism between the rotary blade 50 and the shoe insert 90B. In addition, the shoe 86 has been designed in a "quick connect" manner so that it can be easily removed. This eliminates the need for a shoe cant angle, commonly used in the prior art to compensate for bent shoes. Referring again to FIGS. 1 and 2, the quick connect features include a replacement means, which comprises frame 111 and gib lock 132. Frame 111 has a first end 114 to which the shoe 86 is attached by cap screws 115 and 116. A second end 118 of the frame ill includes a precision dovetail slide 120 which is mounted on the housing 12. The slide 120 is secured to the housing by two mounting screws 130. A gib lock 132 includes at least two gib lock screws 133.

In order to replace or rotate the shoe insert 90, all that must be done is for the gib lock 132 to be released, the frame 111 moved away from the housing 12 on the slide 120 and the worn shoe insert 90B rotated or replaced by a new shoe insert by removing the cap screws 112 and 113. A shim (not shown) may be inserted between the shoe insert 90B and the rotary blade 50 to provide the desired clearance. The frame 111, shoe 86, and shoe insert 90B assembly may then be secured in place by the gib lock 132 and gib lock screws 133. Alternatively the complete shoe assembly including the frame 111, shoe 86 including the shoe insert 90B may be replaced by a new shoe assembly. As opposed to the prior art, where the aforementioned adjustments must be made, the innovative rotary cutter assembly 10 is ready to begin cutting sheets of elastomeric materials.

With reference to the drawings the design of the rotary blade 50 will be further described. The rotary blade 50 features a plurality of lobes 140. The number of lobes 140 can vary between 4 and 40 and is 16 for this embodiment.

Figure 4:
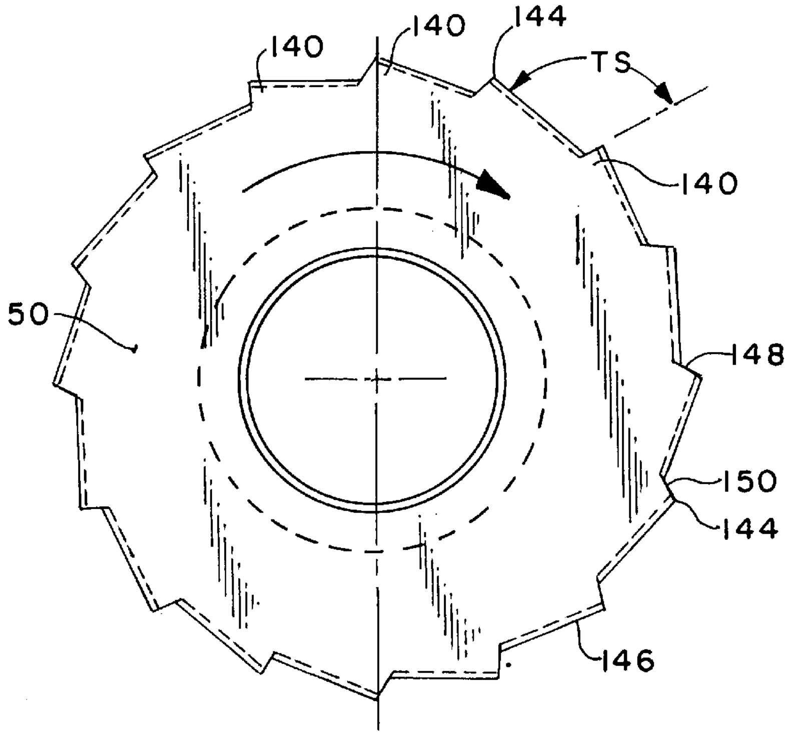
FIG. 4 is an end view of the rotary blade shown in FIGS. 1,2 and 3.
Figure 8:
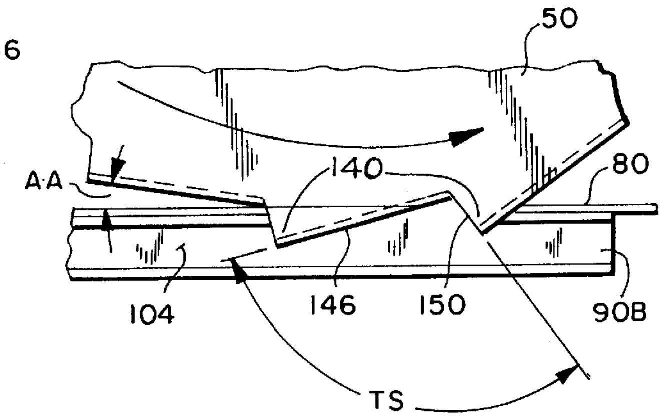
FIGS. 8 and 9 are fragmentary cross-sectional end views of a rotary blade and lobes according to the invention.
Figure 9:
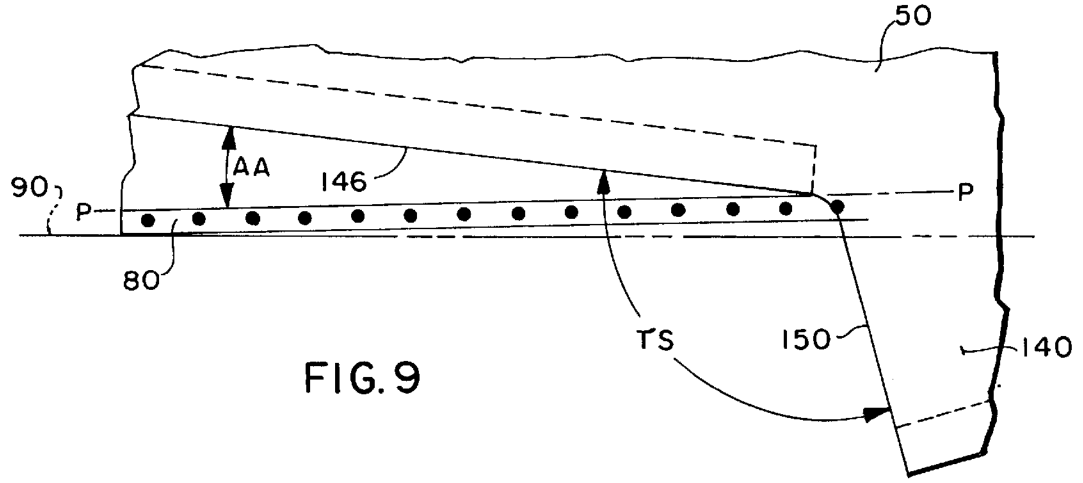

With reference to FIG. 4, the innovative blade 50 incorporates an attack surface 146 which is not symmetrical about the peak 144 and trailing surface 150. Instead, the trailing surface 150 has been cut more sharply, providing relief to ensure that the cut elastomeric material does not rub and/or possibly hang up on any contact surfaces. With reference to FIGS. 3, 4, 8 and 9, the blade 50 is shown schematically in more detail with relation to the shoe 86, shoe insert 90B and the reinforced sheet of elastomeric material 80. As shown in FIG. 9, the attack surface 146 of each blade 50 is disposed at an attack angle AA of preferably 0 degrees to 20 degrees and in the embodiment shown is about 8 degrees. Also the trailing surface 150 is at an angle TS of about 110 degrees to the attack surface 146. Preferably the angle TS is between 100 degrees and 140 degrees. With reference to FIG. 8, the configuration of the innovative lobe 140 is shown as it cuts the sheet of elastomeric material 80. As the speed of rotation of the blade 50 is increased the speed at which the rotary cutter assembly 10 is moveable across the sheet of reinforced elastomeric material 80 may be increased. Also the number of lobes 140 may be decreased. These parameters depend on the number of reinforcing wires 98 because it is desirable that each of the wires is cut by one of the lobes 140.

The present invention has been described with reference to the preferred embodiment. Obviously, modifications and alterations will occur to others upon a reading and understanding of the specification. It is intended by the applicant to include all such modifications and alterations that falls within the scope of the appended claims or the equivalents thereof.

What is claimed is:

1. A high speed rotary cutting apparatus for cutting elastomeric material, said apparatus comprising:

a housing having a first end and a second end and a housing bore between said first end and said second end;

a spindle mounted for rotation within said housing bore; and, a rotary blade fixedly mounted to a first end of said spindle, said spindle and rotatary blade being rotatable at speeds greater than 2000 rpm, said rotary blade having a generally planar cutting surface in a cutting surface plane, a generally planar back surface in a back surface plane, said back surface plane being disposed at an angle α with said cutting surface plane of between 10 degrees and 90 degrees, said rotary blade further including a plurality of peripheral lobes, each of the lobes having an attack surface and a trailing surface separated by a peak, said attack surface and said trailing surface being non-symmetric about a radial line passing through said peak wherein the trailing surface is inclined more sharply than the attack surface.

2. The high speed rotary cutting apparatus of claim 1 wherein said attack surface is disposed at an attack angle AA to a plane perpendicular to said radial line, said attack angle AA being between 0 degrees and 20 degrees and said trailing surface is disposed at a trailing angle TS to said attack surface, said trailing angle TS being about 110 degrees.

3. The high speed rotary cutting apparatus of claim 1 wherein said rotary blade is coated with a non-stick plasma coating.

4. The high speed rotary cutting apparatus of claim 3 wherein said non-stick plasma coating is $B_4N$.

5. The high speed rotary cutting apparatus of claim 1 wherein said spindle has an axial spindle bore and wherein the cutting apparatus further comprises a cooling nozzle mounted adjacent said spindle for propelling air into said spindle bore.

6. The high speed rotary cutting apparatus of claim 1 further comprising:

a first seal located near said first end of said spindle and sealing said spindle from said housing.

7. The high speed rotary cutting apparatus of claim 1 further comprising:

a bearing disposed between said spindle and said housing, said bearing being a preloaded, angular contact ball bearings.

8. The high speed rotary cutting apparatus of claim 1 further comprising:

a shoe having a top surface located in a first plane;

a shoe insert having a top surface in said first plane of said top surface of said shoe, said shoe insert being mounted on said shoe and having a groove adjacent to a cutting surface; and, replacement means for replacing said shoe insert mounted on said housing in sliding relationship to said rotary blade.

9. The high speed rotary cutting apparatus of claim 8 wherein said replacement means comprises:

a frame connected to said shoe at a first end, said frame including a dovetail slide at a second end of said frame and operably connected to said housing.

10. The high speed rotary cutting apparatus of claim 9 wherein said replacement means further comprises:

a gib lock for releasably holding said dovetail slide in a predetermined position relative to said housing.

11. The high speed rotary cutting apparatus of claim 8 wherein said shoe insert has a second cutting edge adjacent to said groove.

12. The high speed rotary cutting apparatus of claim 8 wherein said shoe insert is coated with titanium nitride.

13. A high speed rotary cutting apparatus for cutting elastomeric material, said apparatus comprising:

a housing having a first end and a second end and a housing bore between said first end and said second end;

a spindle mounted for rotation within said housing bore; and, a rotary blade fixedly mounted to a first end of said spindle, said spindle and rotatary blade being rotatable at speeds greater than 2000 rpm, said rotary blade having a generally planar cutting surface in a cutting surface plane, a generally planar back surface in a back surface plane, said back surface plane being disposed at an angle $\alpha$ with said cutting surface plane of between 10 degrees and 90 degrees;

a shoe having a top surface being located in a first plane;

a shoe insert having a top surface in said first plane of said top surface of said shoe, said shoe insert being mounted on said shoe and having a groove adjacent to a cutting surface; and, replacement means for replacing said shoe insert mounted on said housing in sliding relationship to said rotary blade;

wherein said shoe insert has a cross-sectional shape which resembles an "I-beam".

14. The high speed rotary cutting apparatus of claim 1 wherein said rotary blade comprises between 4 and 40 of said peripheral lobes.

15. The high speed rotary cutting apparatus of claim 1 further comprising:

a shoe having a top surface being located in a first plane;

a shoe insert mounted on said shoe, said shoe insert having a top surface generally coplanar with said top surface of said shoe, said shoe insert having a cutting edge parallel to said cutting surface of said rotary blade and closely spaced thereto.

* * * * *